Dec. 26, 1961 T. S. LASZLO 3,015,013

HIGH DENSITY RADIANT HEAT SYSTEMS

Filed May 31, 1960

TIBOR S. LASZLO
INVENTOR.

BY
ATTORNEYS

United States Patent Office 3,015,013
Patented Dec. 26, 1961

---

3,015,013
HIGH DENSITY RADIANT HEAT SYSTEMS
Tibor S. Laszlo, Melrose, Mass., assignor to Avco Corporation, Cincinnati, Ohio, a corporation of Delaware
Filed May 31, 1960, Ser. No. 32,704
15 Claims. (Cl. 219—19)

This invention relates to a source of radiant heat energy and, in particular, to the use of a plasma generator to create a radiating body in a high density radiant heat source.

The mushrooming demand for materials that can be used at extremely high temperatures has greatly increased the interest in solar and other image heating systems as high temperature test appliances. Briefly, an image furnace receives radiant heat energy and focuses it on a small area. Although the intensity of the radiant heat energy per unit area received is small, its magnitude is greatly increased when concentrated on a small area by an image furnace. It is possible, with the use of image furnaces, to obtain extremely high temperatures in a very short time.

The image furnace requires a source of radiant energy for its operation. The source together with the image furnace make up an image heating system.

Two types of image heating systems are widely used, namely (1) the solar furnace which makes use of incident solar radiation; and (2) the carbon arc-image furnace in which the heat flux is radiated from a carbon arc radiant heat source to an image furnace. The solar furnace is an extremely efficient tool, but obviously, it is dependent on the availability of solar energy to its operation.

The carbon arc-image furnace represents an effort to avoid the environmental limitation of the solar furnace since its operation is not dependent on the availability of solar radiation. The carbon arc-image furnace, however, suffers from several other material limitations. The temperatures developed in carbon arc-image furnaces, although high, are roughly half of those obtained in a solar furnace.

Furthermore, the energy radiated is not uniform in intensity. Electric arc intensity is inherently nonuniform. The number and size of particles separating from the electrodes is also not a uniform occurrence. Since these particles radiate heat energy, variations in the radiated heat energy occur. Furthermore, the composition and structure of carbon electrodes are not uniform. As a result current variations occur which affect arc intensity and add to the fluctuations observed in carbon arc-image furnaces. Nothing can be done to eliminate these disturbing variations, although the last two effects may be minimized by extraordinary control measures.

A further limitation of carbon arc-image furnaces is the rapid erosion of the electrodes caused by the combination of high electrical current and temperatures at which the electrodes are required to operate. Each test run is therefore of necessity extremely short and frequent replacement of the carbon electrodes is required. Where provision is made for moving an additional electrode material into the arc region as the electrode is consumed, the maximum time of a test run has been found to be in the order of several minutes. This is due to limitations arising from the manufacture of carbon electrodes.

It is an object of this invention to provide a high energy radiant heat source which avoids the limitations and disadvantages of such prior art devices.

It is another object of the invention to provide a high energy radiant heat source which can supply to an image furnace or other utilization means pure, uncontaminated, radiant heat energy.

It is another object of the invention to provide a radiant heat source which develops a continuous quantity of radiant heat energy at a substantially constant level.

It is still another object of the invention to provide a high energy radiant heat source which makes use of a heating means which need not have an absolutely uniform heat output.

It is still another object of the invention to provide a high energy radiant heat source, which in combination with an image furnace can produce higher temperatures in the image furnace than can be obtained with prior art equipments, notably carbon arc-image furnaces.

It is still another object of the invention to provide a high energy radiant heat source which makes use of a plasma generator to heat a refractory material to an incandescent state whereby the refractory material radiates heat energy.

It is still another object of the invention to provide a radiant heat source which includes means for replacing material separated from a radiating surface.

It is yet another object of the invention to provide an image heating system including in combination an image furnace and a radiant heat source therefor, the latter comprising a radiating body and heating means.

In accordance with the invention a high energy radiant heat source comprises a target, formed preferably from a refractory material. The high density radiant heat source also includes heating means, preferably supplying a high temperature effluent, for heating the target to an incandescent condition whereby heat energy is radiated from the target. Also included in the high energy radiant heat source is a reflecting means for receiving the heat energy radiated from the target and reflecting it to a remote location where it is utilized in an image furnace or other utilization means.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawings, in which:

Figure 1:
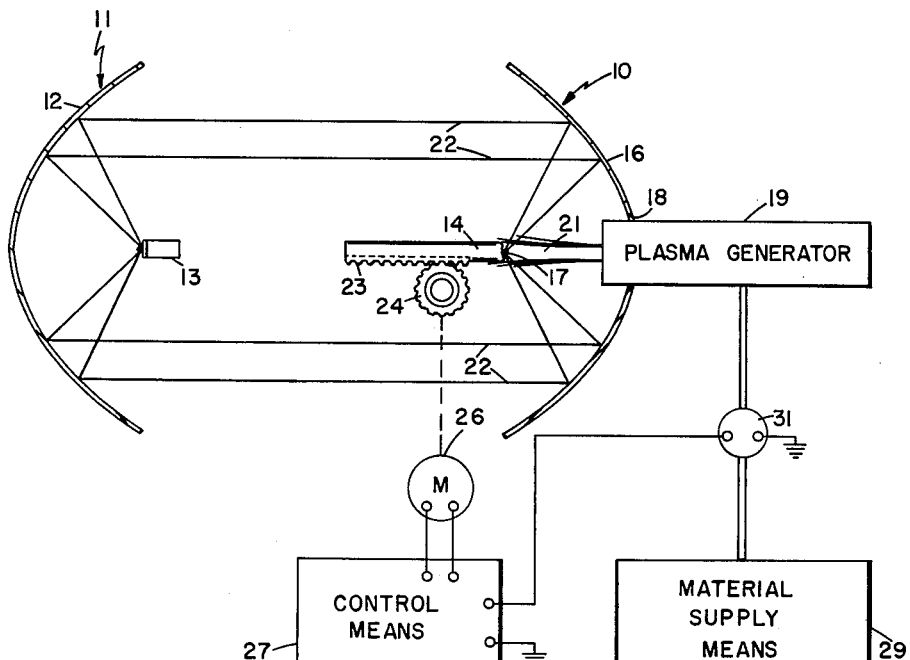
FIGURE 1 is a schematic representation of an image heating system comprising a high energy radiant heat source in combination with an image furnace embodying the principles of the present invention.

Referring to FIGURE 1 of the drawings there is shown a high intensity radiant heat source 10 in combination with an image furnace 11. The image furnace is conventional in construction and two salient members, a parabolic reflector 12 and a test specimen 13, positioned at the focal point of the reflector 12, are depicted in FIGURE 1. No attempt has been made to show structure which is not necessary for describing this invention. This practice will be followed in connection with the high intensity radiant heat source 10 as well.

The high intensity radiant heat source 10 comprises a target 14 comprising a refractory material. The target terminates at one end in a radiating surface 17, which, as will be described later, is heated to incandescence and becomes a high intensity radiating body. The first consideration of the target material is that it withstands extremely high temperatures, since it is well known that the magnitude of infrared energy radiated by an incandescent body increases with temperature. A second consideration of the target material is that it be formed from a material that has a low vapor pressure at the elevated temperatures to which it will be heated. The extent to which a material erodes at elevated temperatures is a direct function of its vapor pressure. Since the life of the target, and more important the duration of continuous operation, is a function of the erosion rate of the target material, it is important to use a material having a low vapor pressure.

A third important consideration in connection with the target material is its emissivity. A material having a high emissivity will radiate more energy at any given temperature than a material having a low emissivity. As discussed heretofore, an advantage of this invention is the generation and use of pure, uncontaminated, radiant heat energy for heating the test specimen. The efficiency of the equipment is determined by the ability of the target to emit high intensity radiant heat energy for a specific power input.

The target material should also have a high viscosity at the temperatures at which it is intended to operate. A material which has a high viscosity at or near its melting point will not tend to flow away and thus increase the erosion rate of the target.

There are several materials which qualify in all of the aforementioned requirements although not to the same extent. Generally, these materials are known as refractory oxides—of which zirconium dioxide and thorium oxide are examples—and refractory carbides—such as tungsten, vanadium, hafnium, titanium and tantalum carbides. Recently skilled metallurgists and ceramists have made solid solutions of combinations of refractory oxides and combinations of refractory carbides which are at least as good, and often better refractory materials, than the individual constituents making up the solid solution. The selection of a preferred target material is dependent on circumstances such as the amount of the power available to heat the target material, the nature of the heating means and the ability to replace material eroding, or ablating from the target 14.

A reflecting means 16, preferably a parabolic mirror is also included in the radiant heat source 10. The radiating surface 17 of target 14 is mounted at the focal point of the reflecting means 16. The reflecting means 16 also includes an opening 18 at the apex of the parabola and inserted through the opening 18 is a plasma generator 19.

A brief discussion on plasma generators would be helpful at this point. A plasma generator is a device in which an electrical arc is struck and maintained, and a fluid, usually a gas, is passed through the arc. As the gas passes through the arc it absorbs energy from the arc and is heated to extremely high temperatures in the order of 15,000 to 20,000° F. Usually the gas is disassociated, or becomes a plasma. That is to say, it is broken down into free electrons and ions in an electrically equilibrium state. The plasma leaves the plasma generator as an effluent. In FIGURE 1 the plasma effluent carries the symbol 21.

Returning to FIGURE 1, the plasma generator 19 and the refractory target 14 are aligned so that the plasma 21 impinges on the surface 17. Typically, when a plasma leaves the generator the free electrons and ions tend to recombine and in doing so give up enormous amounts of heat. In this case the heat given up by the plasma is absorbed by the refractory target 14 and, more particularly, by the surface 17 so that the surface 17 is heated to an incandescent state and radiates energy. A portion of the energy radiated by the surface 17 lies in the infrared region. The infrared energy radiates to the surface of the reflecting means 16 where it is collimated, as shown by the light rays 22 and radiated to the reflecting means 12 of the image furnace 11. In the image furnace 11 the reflecting means acts to focus the collimated light beams on the test specimen 13 and in so doing concentrates the received energy at a small area. The concentrated energy is absorbed by the test specimen raising the temperature of the test specimen, in a conventional image furnace procedure.

As described heretofore, the temperature of the plasma may achieve 15,000 to 20,000° F. At the present time there is no refractory material which can withstand these temperatures and accordingly, the target 14 will vaporize, or ablate, at the surface 17. Surface 17 is therefore a continuously changing one. It is another feature of the invention to present means for (1) replacing refractory material which has evaporated; and (2) for maintaining the surface exposed to the plasma at the focal point of the reflecting means 16 at all times. As a practical matter, the surface 17 does not have to remain precisely at the focal point, though this is recognized as being the optimum position for the surface. In respect to targets made from slightly solid solutions, means is provided for making a solid solution radiating surface as the equipment operates.

The radiant heat source 10 shown in FIGURE 1 includes two means for replacing eroded target material at the surface 17. Either of these two methods may be used independently although the combination results in a more versatile system.

The first of the two systems comprises a rack 23 and pinion 24 assembly for moving the refractory target towards the focal point. The rate of movement is determined by the rate of target erosion. The objective is to maintain the surface 17 at the focal point of reflecting means 16. Referring to FIGURE 1, it will be seen that the rack 23 is attached to the target 14. The pinion 24 is meshed with the rack 23 and mechanically coupled to a motor 26. The positioning means also includes a control means 27 which is coupled to the electric motor and controls the speed thereof for controlling the movement of the target 14.

Figure 3:
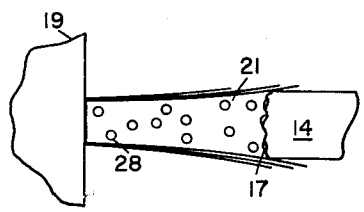
FIGURE 3 is an enlarged view of the radiating surface and adjacent areas.

Plasma generators are also used in spray coating operations, wherein a coating material, usually in the form of a powder is fed to the plasma generator where it is heated to a molten form by the arc and the plasma and ejected from the plasma generator as part of the effluent. When the droplets of the coating material impinge on a surface they tend to spread out and cool forming a coating. The second method for replacing evaporated target material makes use of the aforementioned coating technique. Thus, an effluent carrying molten droplets 28 (FIGURE 3) of material identical to the material from which the target 14 is formed is made to impinge on the surface 17. Upon contact with the surface the droplets will tend to cool and stick to the surface in the manner of a coating operation. Obviously, there will be no substantial cooling, but the temperature difference between the droplets in the effluent and the surface 17 is sufficiently different and a cohesive bond is formed between the droplets and the surface.

Solid solutions of refractory oxides and refractory carbides are formed at extremely high temperatures. Thus, if the target 14 is made of one carbide, and the sprayed material is another carbide, a chemical reaction, initiated by the high temperature environment of the plasma effluent, takes place at the surface 17 forming a solid solution.

Referring again to FIGURE 1, there is shown a block 29 entitled material supply means which is in communication with a control valve 31. The purpose of the control valve 31 is to govern the amount of material passing from the material supply means 29 to the plasma generator 19. The control valve 31 is activated and controlled by the control means 27.

It is recognized that the movement of the target 14 and the rate at which material is deposited on surface 17 can be controlled by means of very accurate servo systems. However, since these systems do not form a basis of novelty for this invention a detailed description is not supplied.

Figure 2:
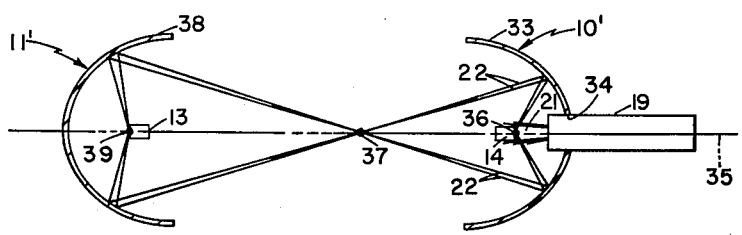
FIGURE 2 is another form of a high temperature image device embodying the principles of the invention.

In FIGURE 2 there is shown an alternate form of an image heating system embodying the principles of the present invention. Elements functioning in the like manner or of a similar nature to elements discussed in relation to FIGURE 1 will carry the same symbols. Preferably the reflecting means in image heating systems should be constructed as a parabola. However, for economy an elliptical reflecting heating surface is widely used. Accordingly, a high intensity radiant heat source 10', in FIGURE 3, includes an elliptical reflecting means 33 including an opening 34 concentric with the major axis 35. The elliptical reflecting means 33 includes near and remote focal points 36 and 37 respectively, with a target 14 positioned on the major axis at the near focal point. A plasma generator 19 is inserted in the opening 34 with its plasma effluent 21 directed against the target 14.

Also aligned on the major axis 35, but spaced from the radiant heat source 10, is an elliptical reflecting means 38 of an image furnace 11'. A test speciment 13 is positioned at the near focal point 39 of the image furnace reflecting means 38. In a conventional reflecting procedure the infrared rays 22 emanating from the target 14 are received by the reflecting surface 33 and pass through its remote focal point 37. These heat rays 22 then diverge and fall on reflecting surface 38 where they are reflected and focused at the focal point 39. The rays 22 concentrated at the focal point 39 provide the necessary radiant energy to heat the specimen 13.

Since there is no direct communication between the radiant heat source and the image furnace the test speciment is not subject to contamination from the target material or particles in the plasma effluent. In addition, the mass of the target 14 integrates any rapid variations in temperature present in the plasma 21 and thus provides heat energy at a substantially constant level. Another advantage of an image heating system described herein is its capability of producing higher temperatures in the image furnace than can be produced in prior art systems, notably the carbon arc-image furnace. It is well known that the temperatures generated in plasma generators are substantially higher than the temperatures generated in carbon arc facilities. Since the radiant heat energy is generated in the target 14, which is easily removed, it is possible to consider the cost of the target material and the cost of the environment, inert, oxidizing or reducing for example, the target must work in, in selecting a material for a specific test.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

I claim:

1. A high intensity radiant heat source comprising: a parabolic reflecting means having a focal point; a target positioned at the focal point; and a heating means having a high temperature effluent impinging on said target for converting said target to a localized high intensity heat radiator, the radiant heat energy being received and reflected by said parabolic reflecting means to a remote location.

2. A high intensity radiant heat source as described in claim 1 in which said parabola includes an opening at its apex and said heating means comprises a plasma generator having a plasma effluent being inserted through the opening with the plasma effluent impinging on said target.

3. A high intensity radiant heat source comprising: a reflecting means having a focal point and a reflecting surface spaced from the focal point for receiving and reflecting radiant energy generated at the focal point; a target terminating in a radiating surface positioned at the focal point of the reflecting means; heating means for converting the radiating surface to a high intensity heat radiator; and means for maintaining the radiating surface at the focal point.

4. A high intensity radiant heat source as described in claim 3 in which said last mentioned means comprises means for moving the target toward or away from the focal point for maintaining the radiating surface thereon at the focal point.

5. A high intensity radiant heat source as described in claim 3 in which the last mentioned means comprises coating means for depositing material on the radiating surface at a predetermined rate for maintaining the radiating surface at the focal point.

6. A high intensity radiant heat source comprising: a reflecting means having a focal point and a reflecting surface spaced from the focal point for receiving and reflecting radiant energy generated at the focal point; a target terminating in a radiating surface positioned at the focal point of the reflecting means; heating means for converting the radiating surface to a high intensity heat radiator; positioning means for moving the target toward or away from the focal point; coating means for depositing material on the radiating surface; and control means coupled to said positioning and coating means for controlling the target movement and the rate of material deposition whereby the radiating surface is maintained at the focal point.

7. A high intensity radiant heat source comprising: a reflecting means having a focal point and a reflecting surface spaced from the focal point for receiving and reflecting radiant energy generated at the focal point; a target terminating in a radiating surface positioned at the focal point of the reflecting means, said target being formed from one material; coating means for depositing a second material on the radiating surface; and heating means for converting the target to a high intensity heat radiator, and for activating a chemical reaction between the first and second materials whereby a refractory radiating surface is formed.

8. A high intensity radiant heat source comprising: a reflecting means having a focal point and a reflecting surface spaced from the focal point for receiving and reflecting radiant energy generated at the focal point; a target terminating in a radiating surface positioned at the focal point of the reflecting means, said target being formed from one material; and heating means including means for depositing a second material on the radiating surface, said heating means converting the target to a high intensity radiator and activating a chemical reaction between the first and second materials whereby a refractory radiating surface is formed.

9. A high intensity radiant heat source as described in claim 8 in which said heating means comprises a plasma generator having a plasma effluent in communication with a supply means for the second material, said plasma generator melting the second material and impacting the molten material on the first material with the plasma effluent.

10. In combination with an image furnace having a first reflecting means, a high intensity radiant heat source comprising: a target; heating means for raising the temperature of said target until it radiates heat energy; and a second reflecting means for receiving radiant heat energy generated by said target and reflecting the radiant heat energy received to the first reflecting means of the image furnace.

11. An image heating system comprising: an image furnace having a first reflecting means; a high intensity radiant heat source comprising a target, heating means for converting said target to a radiator of heat energy, and second reflecting means for receiving radiant energy radiated by the target and directing the radiant energy received to the first reflecting means of said image furnace.

12. An image heating system comprising: an image furnace including a first reflecting means; and a high intensity radiant heat source comprising a second reflecting means having a focal point, a target positioned at the focal point, and a heating means including a high temperature effluent impinging on said target for converting the target to a high intensity heat radiator, the heat radiated by said target being received by said second reflecting means and reflecting to said first reflecting means.

13. An image heating system comprising: an image furnace including a first reflecting means; and a high intensity radiant heat source comprising a second reflecting means having a focal point, a target including a radiating surface adjustably positioned at the focal point, a heating means for converting the radiating surface to a radiant heat source, the heat radiated by the radiating surface being received by said second reflecting means and reflected to said first reflecting means; and means for maintaining the radiating surface at the focal point.

14. An image heating system as described in claim 13 in which said means for maintaining said reflecting surface at the focal point comprises positioning means for moving the target toward or away from the focal point whereby the radiating surface is positioned at the focal point.

15. An image heating system as described in claim 13 in which the means for maintaining the radiating surface at the focal point comprises means for depositing material on the radiating surface concurrently with the application of heat thereto.

References Cited in the file of this patent

UNITED STATES PATENTS

| 1,804,049 | Claus | May 5, 1931 |
| 2,543,053 | Parker | Feb. 27, 1951 |
| 2,919,370 | Giannini et al. | Dec. 29, 1959 |

FOREIGN PATENTS

| 1,061,592 | France | Nov. 25, 1953 |